United States Patent [19]

Reddy

[11] Patent Number: 4,486,366

[45] Date of Patent: Dec. 4, 1984

[54] METHOD OF CONTINUOUSLY PRODUCING HEAT SHRINKABLE AMORPHOUS POLYSTYRENE FOAM LAYER

[75] Inventor: Subba K. Reddy, Toledo, Ohio

[73] Assignee: Owens-Illinois, Inc., Toledo, Ohio

[21] Appl. No.: 458,000

[22] Filed: Jan. 14, 1983

[51] Int. Cl.³ .............................................. B29D 27/00
[52] U.S. Cl. ..................................... 264/25; 264/46.1;
  264/53; 264/129; 264/210.7; 264/230; 264/321;
  264/342 R
[58] Field of Search ................... 264/51, 53, DIG. 18,
  264/46.1, 321, 230, 342 R, 129, 210.7

[56] References Cited

U.S. PATENT DOCUMENTS

| | | | |
|---|---|---|---|
| 3,640,915 | 2/1972 | Cooper | 264/DIG. 18 |
| 3,733,381 | 5/1973 | Willette et al. | 264/53 X |
| 3,767,496 | 10/1973 | Amberg et al. | 264/342 X |
| 3,901,835 | 8/1975 | Paiella et al. | 264/DIG. 18 |
| 3,953,558 | 4/1976 | Hatano et al. | 264/DIG. 18 |
| 4,038,446 | 7/1977 | Rhoads | 264/46.1 X |
| 4,244,900 | 1/1981 | Heider | 264/46.1 |
| 4,312,960 | 1/1982 | Ort et al. | 264/230 X |
| 4,339,551 | 7/1982 | Heider | 264/51 X |

OTHER PUBLICATIONS

*Crystalline Olefin Polymers*, vol. XX, Part 1, Editors: R. A. V. Raff and K. W. Doak, New York, Interscience Publ., Div. of John Wiley & Sons, Inc., ©1965, pp. 686–690.

Brydson, J. A., *Plastics Materials*, Princeton, N.J., D. Van Nostrand, ©1966, pp. 33–35, 103, 104, 107, 123.

*Primary Examiner*—Philip Anderson
*Attorney, Agent, or Firm*—John R. Nelson; Myron E. Click

[57] ABSTRACT

There is provided a method of continuously producing a highly oriented heat shrinkable single layer of amorphous styrene foam or a composite of a thermoplastic film and an amorphous polystyrene foam to form a heat shrinkable two-layer sheet that is easily stored without substantial shrinkage at ambient temperature, the outstanding single-layer sheet or two-layer sheet being adapted for heat shrinking rapidly to form a label around a container or a cup. The outstanding method comprises extruding a single foam sheet or coextruding a thermoplastic film and an amorphous polystyrene foam layer to form the two-layer sheet, bringing the sheet to its orientation temperature, stretching the two-layer sheet at its orientation temperature in at least a longitudinal direction to provide a dimensionally stable, storable, oriented polystyrene foam sheet or a thermoplastic film/amorphous polystyrene foam layer sheet, printing on the oriented sheet to decorate the same, and heat shrinking the sheet to form a final attractive, decorated structure.

13 Claims, 5 Drawing Figures

METHOD OF CONTINUOUSLY PRODUCING HEAT SHRINKABLE AMORPHOUS POLYSTYRENE FOAM LAYER

The present invention relates to a method of making a highly oriented single layer of amorphous polystyrene foam sheet and to a method of making a composite of polystyrene foam/thermoplastic film which shrink at substantially lower temperatures, are dimensionally stable during shipping and handling, and have excellent surface appearance for printing and decoration.

The invention also relates to a method of making a highly oriented single layer of polystyrene foam sheet and a composite of polystyrene foam/thermoplastic film which can be readily heat shrunk as a label at substantially lower temperatures around glass and oriented plastic containers, including PET (polyethylene terephthalate) carbonated beverage bottles. The sheet or composite also is easily made into a cup.

BACKGROUND OF THE INVENTION

Shrinkage is one of the most critical properties that control the conversion efficiency of polystyrene foams in wrapping glass and PET containers and in making cups, (including disposal cups). The shrinkage results from molecular orientation induced to the foam during "blown bubble" extrusion process. In this process, the polymer melt with appropriate blowing agents dissolved in it is cooled to the proper extrusion temperature before it is pushed through an annular die. Foaming takes place immediately after the melt exits the die. The foamed bubble is pulled over a sizing mandrel while it is cooled on the inside and outside with air. The combined effect of drawing over the mandrel, low melt temperatures and air cooling results in imparting the shrink property to the foam.

The amount of molecular orientation induced in amorphous polymers depends strongly on the temperature of deformation as well as the strain rate. The most suitable temperature is situated just above the softening point of the material. In practice, however, processability (throughput) dictates the temperature at which orientation is carried out. Many process variables exert strong influence on the orientation imparted to the foam during blown bubble extrusion process. Some of these variable include the temperature of the polymer melt before it exits the die, the line speed, the temperature and amount of air flow used on the inside and outside of the bubble for cooling and the concentration of nucleating and blowing agents.

Many problems have been experienced in controlling the orientation required of PS (polystyrene) foams for converting into disposable cups and in wrapping glass and PET containers. In many cases, the extruded foam with inadequate orientation is unusable. Serious problems have been experienced in labeling PET containers with polystyrene foam labels due mainly to the sensitivity of oriented PET containers to the thermal treatment during labeling operation. Unacceptable bottle shrinkage generally resulted when PET containers were labeled with PS foam labels. In order to eliminate the above problem, polystyrene foams were prepared with halogenated hydrocarbons including halogenated alkanes with at least one fluorine atom such as dichlorodifluromethane as blowing agents and resulted in high residual halogenated hydrocarbon content. Since these halogenated hydrocarbons are good plasticizers for polystyrene, the shrinkage onset temperature was reduced which minimized the bottle shrinkage. The main disadvantage of this approach is that the halogenated hydrocarbon diffuses out of the foam during aging, shipping and handling which increases the shrinkage onset temperature and, therefore, the bottle shrinkage.

One of the disadvantages of foamed plastics for labeling is their poor surface appearance, particularly compared to films. In order to improve the surface appearance for printing and decoration, coextruded foams consisting of polystyrene foam/polystyrene film have been introduced. Because of a very thin solid layer of polystyrene used in the coextruded structure and the interfacial problems associated in coextrusion, the coextruded foams provided a rather rough surface. This rough surface required the use of an undercoat before printing which resulted in increasing the cost of the material. In addition, the coextruded labels could not be used for wrapping PET containers due to differential shrink properties of the foam and solid layers. The conventional method of controlling the orientation during the "blown bubble" extrusion is, therefore, not satisfactory for decreasing the shrinkage onset temperature that is required for labeling PET containers. Lower shrinkage onset temperature is also desirable for increasing the line speed in wrapping glass containers and in converting into disposable cups.

Polystyrene foams have certain deficiencies such as brittleness, easy tearing and easy fracture. Polyethylenefoam/thermoplastic film composites in the prior art were stated to be superior to polystyrene foams in eliminating the brittleness, tearing and easy fracture. As noted in the Rhoades U.S. Pat. No. 4,038,446, assigned to Owens-Illinois, Inc., polyethylene foam/thermoplastic film layers were thought to have superior commercial characteristics. In the Rhoads patent, column 2, lines 31 to 41, it is stated that polystyrene foams have heretobefore been found deficient. The polystyrene foams were found to be possessed of certain deficiencies such as brittleness, easy tearing, and easy fracture. The Rhoads patent leads away from the use of amorphous polystyrene foam and discusses the outstanding characteristics of polyolefin foam such as polyethylene foam for heat shrunk sleeves.

In the prior art, U.S. Pat. No. 4,244,900 to James E. Heider, assigned to Owens-Illinois, Inc., shows the making of a heat shrunk cellular polyethylene sleeve for a container from a two-layer sheet comprising a thermoplastic film and a foamed polyethylene layer.

The Heider patent U.S. Pat. No. 4,244,900 discloses processing of polyolefin foams by secondarily stretching the coextruded polyolefin foam/thermoplastic film sheet at its orientation temperature to provide a heat shrunk sleeve that shrinks at a lower temperature and at a faster rate. The Heider patent further discloses that the thermoplastic foam layer is made of polyethylene or another crystalline polymer.

In the Heider patent, the shrink properties of the crystalline polyethylene foam/crystalline polymer film were improved by stretching the composite after extrusion. It should be noted that polyethylene foam/film composites have not been used generally despite the superior properties stated above. This apparently is attributed to poor shrinkage behavior and dimensional stability problems associated with the above structures.

Since polystyrene foam is the most widely used material for labeling glass and PET containers and for converting into disposable cups, there is a need to improve its surface appearance and the srinkage behavior. It is desirable that the foam shrink at low temperatures while maintaining dimensional stability during shipping and handling.

In the prior art there has been a need for a method of continuously producing a heat shrinkable, one-layer or two-layer sheet that is readily storable without substantial shrinkage at room temperature and a sheet that is readily adapted to heat shrink rapidly around a container such as a bottle to form a label thereon or to form a disposable cup. Hence, a final structure that is a storable, economical, attractive, decorated, single-layer foam sheet or a two-layer sheet comprising a thermoplastic film and a foam layer has been desired.

It is an object of the present invention to provide a method of making a highly oriented single-layer amorphous polystyrene foam sheet or a thermoplastic film/amorphous polystyrene foam sheet with excellent surface smoothness for printing and decoration which can shrink at low temperature to form a label or cup while maintaining dimensional stability at ambient temperature.

It is an object of the present invention to provide an outstanding method of continuously producing a heat shrinkable thermoplastic film and an amorphous polystyrene foam to form a heat shrinkable two-layer sheet that is easily storable without substantial shrinkage at ambient temperature and a sheet that will heat shrink rapidly to form a label or a cup, the method comprising the steps of:

A. coextruding a thermoplastic film and an amorphous polystyrene foam layer to form a two-layer sheet having a continuously formed length as it is conducted away from the coextruder, the length being greater than the width of the sheet;

B. bringing the two-layer sheet to its orientation temperature after the foam layer is formed;

C. stretching the two-layer sheet at its orientation temperature in a longitudinal direction to reduce its thickness and to provide a dimensionally stable, storable, oriented thermoplastic film/amorphous polystyrene foam sheet;

D. printing on the oriented sheet to decorate the same to thereby provide an oriented, decorated, storable sheet; and E. heat shrinking the storable, oriented sheet to form a final attractive, decorated structure.

These and other objects will be apparent from the specification that follows, the appended claims, and the drawings in which:

THE INVENTION

The previously mentioned objects have been accomplished in the present invention by controlling the orientation of the amorphous polystyrene foam after extrusion and not during "blown bubble" extrusion process, the method comprising steps of:

1. extruding a polystyrene foam sheet as a single layer, or coextruding a polystyrene foam/thermoplastic film composite with little or no orientation during the blown bubble extrusion;

2. heating the foam sheet by contacting with hot rolls or infrared heaters to the desired orientation temperature;

3. stretching the sheet in a longitudinal direction between a pair of closely spaced rolls running at different speeds to reduce the thickness and increase the orientation;

4. printing on the oriented sheet; and 5. heat shrinking the oriented sheet to form a final attractive decorated structure.

Figure 5:
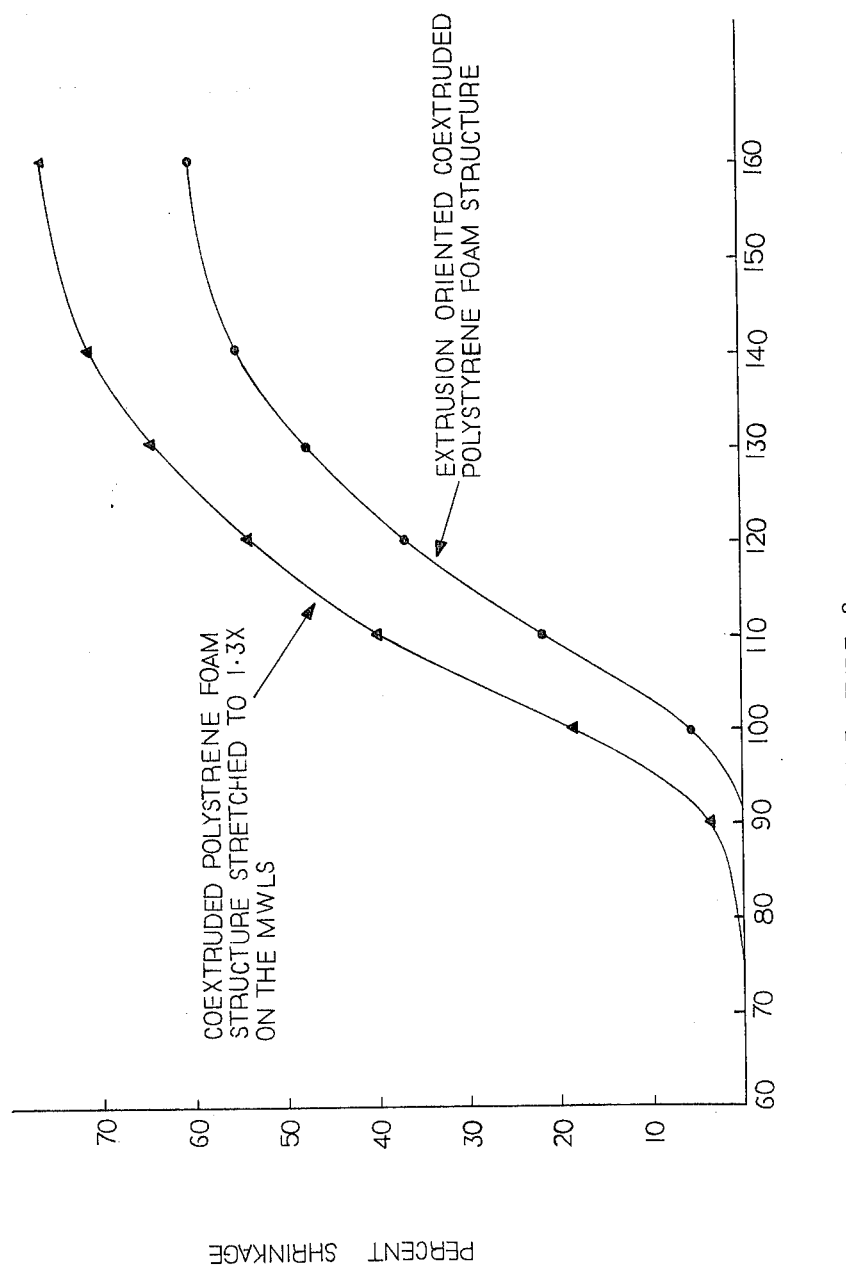
FIG. 5 is a graph in which heat shrink processing temperature is plotted against percent shrinkage to illustrate the dynamic shrinkage response of the foam layer before and after stretching.

FIG. 5 shows that controlling orientation after extrusion is superior to "blown bubble" orientation. The results show that a blown bubble oriented amorphous polystyrene foam starts to shrink at 90° C., giving about 20% shrinkage at 110° C. while a post-extrusion oriented PS foam of the present invention starts to shrink at 75° C. and gives about 40% shrinkage at 110° C. In addition, the total shrinkage is also higher. The post-extrusion oriented amorphous polystyrene foam also provides an excellent surface for printing and decoration. Although the exact mechanisms responsible for the improved surface are not known, and not wishing to be bound by theory, it is believed that the combined effect of heat treatment, stretching and nipping (from the nip rolls), results in improving the surface appearance. It is believed that the closed cells expand during the heat treatment from the residual blowing agent trapped in the cells. The stretching and nipping of the amorphous polystyrene foam results in creating a smooth surface while in a blown bubble process, rough surfaces result.

The present invention provides an outstanding method of continuously producing a dimensionally stable, storable, oriented single amorphous polystyrene layer or a thermoplastic film/amorphous polystyrene foam sheet that can be easily printed on and heat shrunk to form a final attractive, decorated structure that can take the form of a heat shrunk label around a container or a disposable cup.

The present invention provides a method of continuously producing a storable, dimensionally stable, oriented thermoplastic film/amorphous polystyrene foam sheet by coextruding the film and the amorphous styrene foam, the method comprising the steps of:

A. coextruding the thermoplastic film and amorphous polystyrene foam layer to form a two-layer sheet;

B. bringing the two-layer sheet to its orientation temperature;

C. stretching the two-layer sheet at its orientation temperature in preferably a longitudinal direction or in both a longitudinal direction and transverse direction to form a storable, oriented sheet;

D. printing on the oriented sheet; and

E. heat shrinking the oriented sheet to form a final attractive, decorated structure.

In accordance with the present invention there is provided an extruded amorphous polystyrene foam layer or a coextruded amorphous polystyrene foam and thermoplastic film sheet material that is stable, economical, and easily storable until use as a highly effective heat shrink sleeve around a container or for use as a disposable cup. As indicated, the single foam layer or the amorphous polystyrene foam and thermoplastic film sheet layer structure shrink at a lower temperature and a faster rate when used as, for instance, a heat shrunk sleeve label. In spite of the deficiencies attributed to polystyrene foam by the prior art, outstanding results have been obtained.

In any event, in spite of the deficiencies attributed to amorphous polystyrene foams in the prior art, the present invention provides an outstanding polystyrene foam/thermoplastic film structure.

Figure 1:
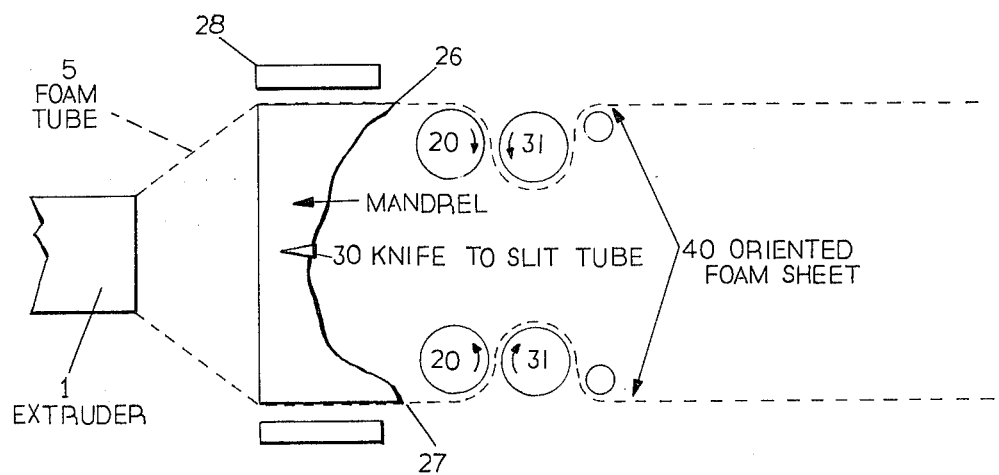
FIG. 1 is a fragmentary schematic elevational view showing the coextruding and orienting apparatus and method of the present invention.

Turning to the drawings that show the outstanding method of the present invention, FIG. 1 shows an extruder 1 for extruding a tubular blown sheet 5 that is an amorphous polystyrene foam layer. The tubular sheet 5 is conducted away from the extruder by suitable means such as a pair of rollers 20 to form two flat sheets of amorphous styrene foam 26 and 27. A knife 30 is placed against the blown tube 5 to slit the blown tubular sheet into two portions, each being carried away by the pair of rollers 20. As seen in FIG. 1, the flat sheets 26 and 27 each pass between two offset rollers 31 and the rollers 20 at its orientation temperature to provide the oriented amorphous polystyrene sheet 40.

The rollers 20 and 31 may be driven at different rates of rotation to effect stretching as is known in the art. The roller 20 may be heated at a higher temperature than the roller 31 and the sheets 26 and 27 can each be preheated by infrared heaters 28 before reaching the roller 20. Each of the sheets 26 and 27 can be also stretched in transverse direction, as well as in its longitudinal direction which is well known in the art. The oriented sheet 40, produced by the apparatus in FIG. 1, is easily storable at ambient temperature and dimensionally stable. The highly oriented sheet 40 is easily decorated by printing on and can be formed into a heat shrink sleeve label.

Figure 2:
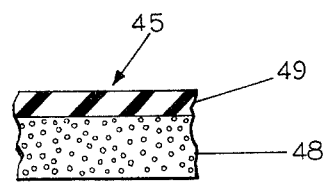
FIG. 2 is a fragmentary sectional view of the dimensionally stable, economical two-layer sheet of thermoplastic film and amorphous polystyrene foam made according to the present invention.

As well known in the art, and as shown in FIG. 2, a composite 45 of an amorphous polystyrene foam layer 48 and a thermoplastic film 49 can be formed by coextrusion using the apparatus in FIG. 1. In this case, the composite is conducted away by the rollers and stretched in the same way as the single polystyrene foam sheet.

Figure 3:
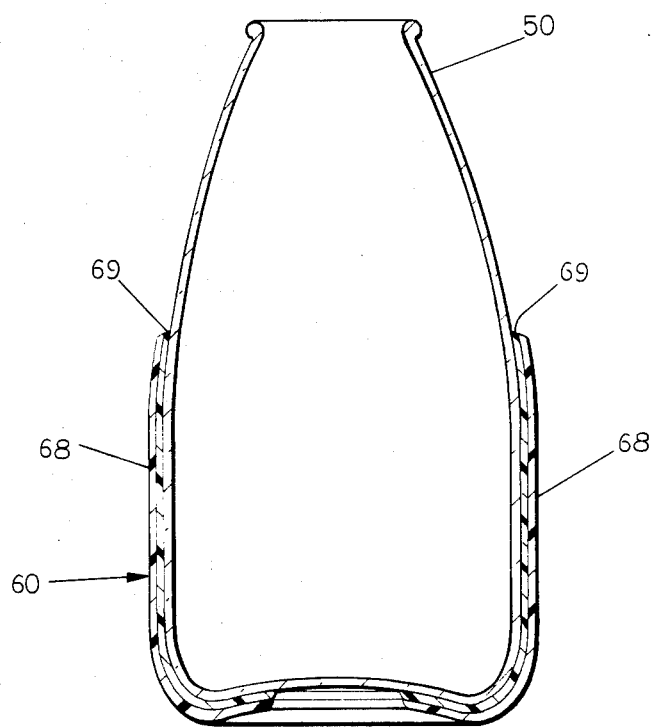
FIG. 3 is a vertical, sectional, elevational fragmentary view, shown partly in section, of a container and a heat shrunk sleeve label in accordance with the present invention.

A heat shrunk label can be applied to a container as shown in FIG. 3. The outstanding label can be applied to a container such as a bottle 50 by methods known in the arts such as shown in U.S. Pat. No. 3,767,496 to Amberg et al. The oriented sheet composite 60 is shown in FIG. 2, it having an oriented film layer 68 and an oriented polystyrene foam layer 69.

Figure 4:
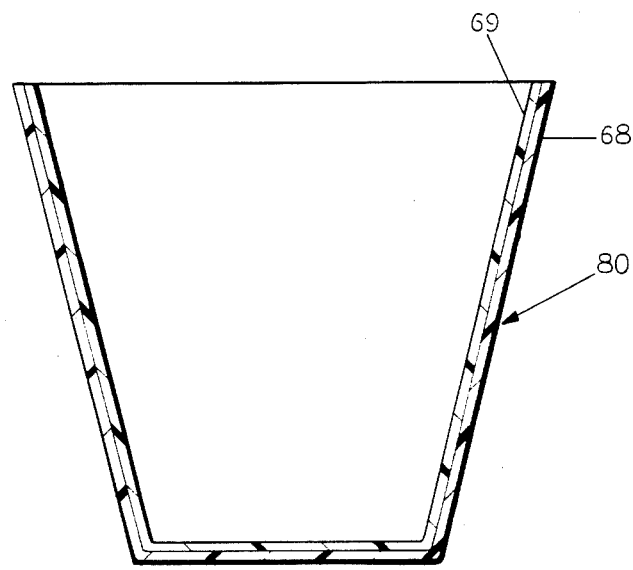
FIG. 4 is an elevational view of a disposable cup made with the oriented heat shrinkable two-layer structure of the present invention.

As shown in FIG. 4, the oriented composite sheet can be easily formed into an attractive, decorated disposal cup 80 by heat shrinking the sheet using known thermoforming methods.

What is claimed is:

1. A method of continuously producing a highly oriented polystyrene foam sheet which shrinks at substantially lower temperatures to form a label or a cup, the foam sheet being dimensionally stable during shipping and handling and have excellent surface appearance for printing and decoration, the method comprising the steps of:

A. extruding an amorphous polystyrene foam sheet as a single layer with little or no orientation during the extrusion;
  B. heating the foam sheet by contacting hot rolls or by exposing to infrared heaters to the orientation temperature;
  C. stretching the sheet in a longitudinal direction between a pair of spaced rolls running at different speeds to reduce its thickness, and provide a dimensionally stable, highly oriented structure;
  D. printing on the oriented sheet to decorate the same to thereby provide a dimensionally stable, decorated sheet; and
  E. heat shrinking the decorated, oriented sheet to form a final attractive structure.

2. A method as defined in claim 1 in which the final structure is a label that is heat shrunk around a container.

3. A method as defined in claim 1 in which the final structure is a cup.

4. A method as defined in claim 1 in which the stretching in Step C is also done in the cross-machine direction that is substantially perpendicular to the longitudinal axis of the sheet.

5. A method as defined in claim 1 in which infrared heating is used in Steps B and E.

6. A method of continuously producing a heat shrinkable thermoplastic film and an amorphous polystyrene foam to form a heat shrinkable two-layer sheet that is easily storable without substantial shrinkage at ambient temperature and a sheet that will heat shrink rapidly at substantially lower temperatures to form a label or a cup, the method comprising the steps of:

A. coextruding a thermoplastic film and an amorphous polystyrene foam layer to form a two-layer sheet having a continuously formed length as it is conducted away from the coextruder, the length being greater than the width of the sheet;
  B. bringing the two-layer sheet to its orientation temperature after the foam layer is formed;
  C. stretching the two-layer sheet at its orientation temperature in a longitudinal direction to reduce its thickness and provide a dimensionally stable, storable, oriented thermoplastic film/amorphous polystyrene foam sheet;
  D. printing on the oriented sheet to decorate the same to thereby provide an oriented, decorated, storable sheet; and
  E. heat shrinking the storable, oriented sheet to form a final attractive, decorated structure.

7. A method as defined in claim 6 in which the final structure is a label that is heat shrunk around a container.

8. A method as defined in claim 6 in which the final structure is a cup.

9. A method as defined in claim 6 in which the stretching in Step C is also done in the cross-machine direction that is substantially perpendicular to the longitudinal axis of the sheet.

10. A method as defined in claim 6 in which infrared heating is used in Step E.

11. A method as defined in claim 1 in which a thermoplastic film is extruded with the foamed amorphous polystyrene sheet to provide a polystyrene form/thermoplastic film composite.

12. A method as defined in claim 1 in which the heating in step B and the stretching in step C of the heated sheet at its orientation temperature provides a dimensionally stable structure that is highly oriented compared to the orientation, if any after step A, the structure after step C having a lower onset shrinkage temperature than the structure after step A.

13. A method as defined in claim 6 in which the stretching in step C of the two-layer sheet at its orientation temperature provides a highly oriented film/foam sheet that has an onset of shrinkage temperature as low as about 75° C., there being a shrinkage of about 40% at about 110° C.

* * * * *